United States Patent
Barlovic et al.

(10) Patent No.: US 8,155,770 B2
(45) Date of Patent: Apr. 10, 2012

(54) METHOD AND APPARATUS FOR DISPATCHING WORKPIECES TO TOOLS BASED ON PROCESSING AND PERFORMANCE HISTORY

(75) Inventors: Robert Barlovic, Dresden (DE); Uwe Schulze, Dresden (DE); Jan Raebiger, Dresden (DE); Joerg Weigang, Dresden (DE); Jens Busch, Radebeul (DE); Rolf Seltmann, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 367 days.

(21) Appl. No.: 12/415,258

(22) Filed: Mar. 31, 2009

(65) Prior Publication Data
US 2010/0249967 A1    Sep. 30, 2010

(51) Int. Cl.
*B26D 5/00* (2006.01)
*G06F 19/00* (2011.01)
*B31B 1/00* (2006.01)
*B31B 1/28* (2006.01)
*B26D 7/06* (2006.01)

(52) U.S. Cl. .......... 700/99; 83/25; 83/75.5; 483/21; 493/466; 493/468; 700/92; 700/97; 700/174; 700/192; 700/204

(58) Field of Classification Search .......... 700/92, 700/97, 99, 174, 204, 192; 493/466, 468; 83/25, 75.5; 483/21
See application file for complete search history.

(56) References Cited

U.S. PATENT DOCUMENTS

| | | | | |
|---|---|---|---|---|
| 4,931,722 A | * | 6/1990 | Stoica | 714/733 |
| 5,144,709 A | * | 9/1992 | Rooney | 72/335 |
| 5,444,632 A | | 8/1995 | Kline et al. | 364/468 |
| 5,617,340 A | * | 4/1997 | Cresswell et al. | 702/85 |
| 5,857,258 A | * | 1/1999 | Penzes et al. | 29/846 |
| 5,940,787 A | | 8/1999 | Gelston | 702/134 |
| 6,088,626 A | | 7/2000 | Lilly et al. | 700/100 |
| 6,105,520 A | | 8/2000 | Frazer et al. | 112/117 |

(Continued)

FOREIGN PATENT DOCUMENTS

EP   1 150 187 A2   10/2001

(Continued)

OTHER PUBLICATIONS

Holfeld et al., "A Fab-Wide APC Sampling Application", IEEE, 2007, p. 393-399.*

(Continued)

*Primary Examiner* — Ramesh Patel
*Assistant Examiner* — Thomas Stevens
(74) *Attorney, Agent, or Firm* — Williams, Morgan & Amerson, P.C.

(57) ABSTRACT

Metrology data associated with a plurality of workpieces processed at a selected operation in the process flow including a plurality of operations is retrieved. A processing context associated with each of the workpieces is determined. The processing context identifies at least one previous tool used to perform an operation on the associated workpiece prior to the selected operation. A plurality of performance metrics is determined for a plurality of tools capable of performing the selected operation based on the metrology data. Each performance metric is associated with a particular tool and a particular processing context. A set of the performance metrics is identified for the plurality of tools having a processing context matching a processing context of a selected workpiece awaiting performance of the selected operation. The selected workpiece is dispatched for processing in a selected one of the plurality of tools based on the set of performance metrics.

18 Claims, 3 Drawing Sheets

U.S. PATENT DOCUMENTS

| | | | |
|---|---|---|---|
| 6,128,588 A | 10/2000 | Chacon | 703/6 |
| 6,260,427 B1 | 7/2001 | Jones et al. | 73/865.9 |
| 6,368,884 B1* | 4/2002 | Goodwin et al. | 438/14 |
| 6,415,196 B1 | 7/2002 | Crampton et al. | 700/100 |
| 6,456,894 B1 | 9/2002 | Nulman | 700/100 |
| 6,508,896 B1* | 1/2003 | Jao et al. | 156/64 |
| 6,615,101 B1* | 9/2003 | Nicholson et al. | 700/173 |
| 6,665,623 B1* | 12/2003 | Pasadyn et al. | 702/84 |
| 6,790,686 B1* | 9/2004 | Purdy et al. | 438/14 |
| 6,889,113 B2* | 5/2005 | Tasker et al. | 700/180 |
| 6,912,436 B1* | 6/2005 | Jones et al. | 700/121 |
| 6,959,224 B2* | 10/2005 | Good et al. | 700/97 |
| 6,978,187 B1* | 12/2005 | Ryskoski | 700/100 |
| 6,987,876 B2* | 1/2006 | Silber et al. | 382/152 |
| 7,198,964 B1* | 4/2007 | Cherry et al. | 438/14 |
| 7,212,950 B2* | 5/2007 | Poolla | 702/183 |
| 7,583,852 B2* | 9/2009 | Venkatachalam | 382/260 |
| 7,934,125 B2* | 4/2011 | Harvey et al. | 714/25 |
| 2002/0082738 A1* | 6/2002 | Goldman et al. | 700/109 |
| 2004/0040001 A1* | 2/2004 | Miller et al. | 716/4 |
| 2004/0131226 A1* | 7/2004 | Poolla | 382/100 |
| 2005/0209732 A1* | 9/2005 | Audimoolam et al. | 700/216 |
| 2007/0263921 A1* | 11/2007 | Nakasugi et al. | 382/145 |
| 2010/0158343 A1* | 6/2010 | Bryll | 382/141 |

FOREIGN PATENT DOCUMENTS

JP  2003086831 A  *  3/2003

OTHER PUBLICATIONS

Bucheim, R; "Developing Performance Metrics for a Design Engineering Department"; IEEE Transaction on Engineering Management; vol. 47, issue 3; Aug. 2000; pp. 309-320.*

* cited by examiner

Figure 3 ers may be assigned on the basis of the number of wafers in the lot or its status as a test or experimental lot, for example.

METHOD AND APPARATUS FOR DISPATCHING WORKPIECES TO TOOLS BASED ON PROCESSING AND PERFORMANCE HISTORY

CROSS-REFERENCE TO RELATED APPLICATIONS

Not applicable.

BACKGROUND

The disclosed subject matter relates generally to manufacturing and, more particularly, to a method and apparatus for dispatching workpieces to tools based on processing and performance history.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Pre-processing and/or post-processing metrology data is supplied to process controllers for the tools. Operating recipe parameters are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

In a typical semiconductor fabrication facility, wafers are processed in groups, referred to as lots. The wafers in a particular lot generally experience the same processing environment. In some tools, all of the wafers in a lot are processed simultaneously, while in other tools the wafers are processed individually, but under similar conditions (e.g., using the same operating recipe). Typically, a lot of wafers is assigned a priority in the beginning of its processing cycle. Priority may be assigned on the basis of the number of wafers in the lot or its status as a test or experimental lot, for example.

At a particular processing step, the relative assigned priorities of all the lots ready for processing are compared. Various rules are applied to determine which of the eligible lots is selected for processing. For example, for two lots with the same priority, the older of the lots is often selected for subsequent processing. In the case of a test lot of wafers (i.e., generally including a reduced number of wafers), the lot is subjected to one or more experimental processing steps or recipe adjustments in an attempt to improve the performance of the process or the performance of the resultant devices. Before commencing production of regular production lots using the experimental parameters, it is useful to first test the effectiveness of the changes based on the resulting characteristics of the wafers in the test lot. Hence, a test lot would be assigned a relatively high priority over other production lots, such that its processing is completed more quickly. Regardless of the particular priority assignments made, the rules are essentially static and predetermined. The priority of a particular lot does not typically change during its processing cycle, unless its status changes from being a production lot to a test lot, for example.

During the fabrication process various events may take place that affect the end performance of the devices being fabricated. That is, variations in the fabrication process steps result in device performance variations. Factors, such as feature critical dimensions, doping levels, contact resistance, particle contamination, etc., all may potentially affect the end performance of the device. Both factors associated with the wafers (e.g., processing history) and factors associated with the tools (e.g., tool health, tool signature, etc.) can affect the end performance.

At a given process step, one or more processing tools may be available for performing the required processing. Although the various tools are generally capable of performing the same process on the lot, the tools may not be operating at the same level of proficiency or the characteristics of the incoming wafers may be such that they affect the processing in a particular tool. Scheduling the lots through the processing line based on tool availability and lot priority may ignore relevant wafer and tool specific characteristics that may make a particular tool better suited for processing a particular lot, resulting in a reduction in the quality of the processing and/or the fabricated devices.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for dispatching workpieces in a process flow including a plurality of operations. The method includes retrieving metrology data associated with a plurality of workpieces processed at a selected operation in the process flow. A processing context associated with each of the workpieces is determined. The processing context identifies at least one previous tool used to perform an operation on the associated workpiece prior to the selected operation. A plurality of performance metrics is determined for a plurality of tools capable of performing the selected operation based on the metrology data. Each performance metric is associated with a particular tool and a particular processing context. A set of the performance metrics is identified for the plurality of tools having a processing context matching a processing context of a selected workpiece awaiting performance of the selected operation. The selected workpiece is dispatched for processing in a selected one of the plurality of tools based on the set of performance metrics.

Another aspect of the disclosed subject matter is seen a system including a plurality of tools capable of performing a selected operation in a process flow, a tool ranking unit, and a dispatching unit. The tool ranking unit is operable to retrieve metrology data associated with a plurality of workpieces previously processed at the selected operation, determine a processing context associated with each of the workpieces, the processing context identifying at least one previous tool used to perform an operation on the associated workpiece prior to the selected operation, determine a plurality of performance metrics for a plurality of tools capable of performing the selected operation based on the metrology data, each performance metric being associated with a particular tool and a particular processing context, identify a set of the performance metrics for the plurality of tools having a processing context matching a processing context of a selected workpiece awaiting performance of the selected operation, and generate a tool score for each of the tools based on the performance metrics. The dispatching unit is operable to dispatch the selected workpiece for processing in a selected one of the plurality of tools based on the tool scores.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
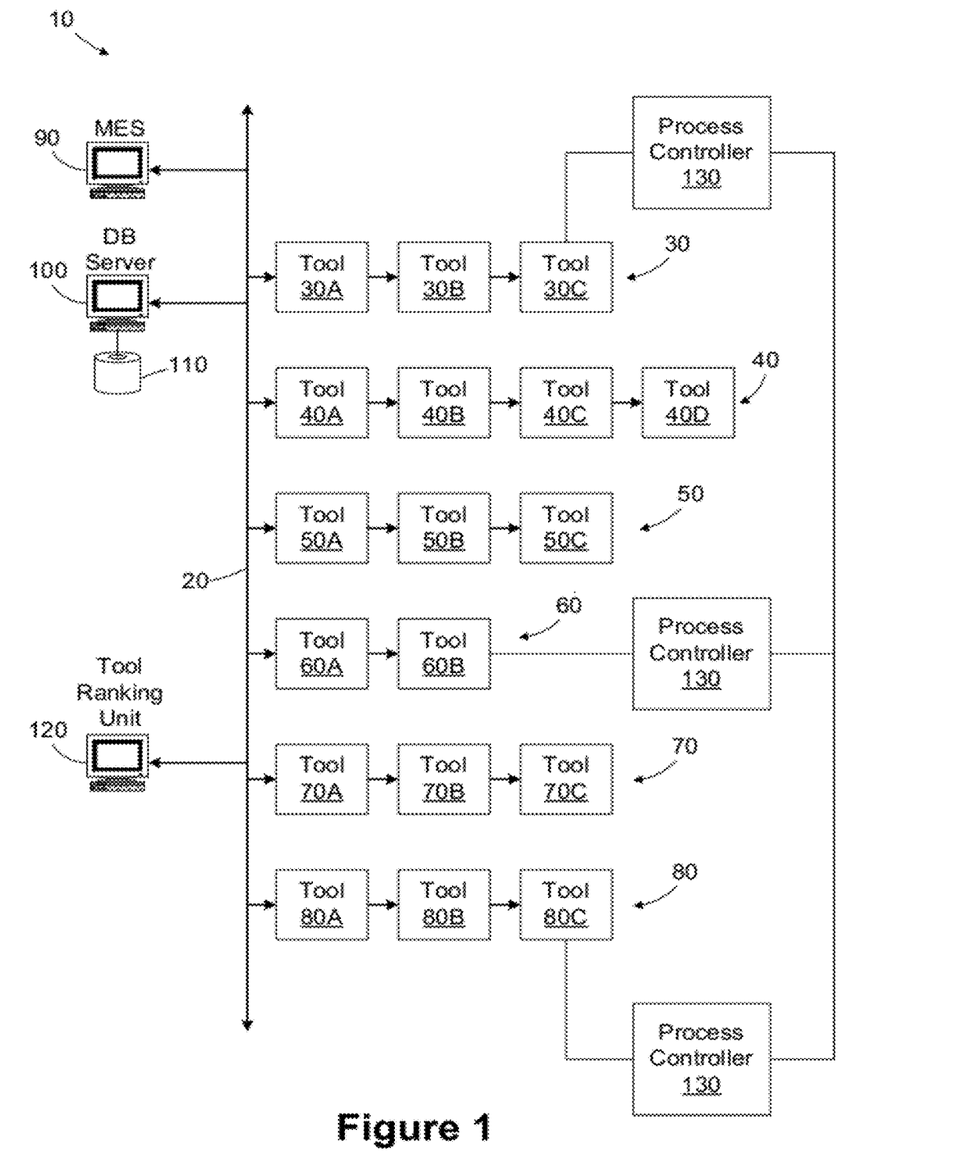
FIG. 1 is a simplified diagram of a manufacturing system including a tool ranking unit in accordance with one illustrative embodiment of the present subject matter.

Referring now to the drawings wherein like reference numbers correspond to similar components throughout the several views and, specifically, referring to FIG. 1, the disclosed subject matter shall be described in the context of a simplified block diagram of an illustrative manufacturing system 10. The manufacturing system 10 includes a network 20, a plurality of tools 30-80, a manufacturing execution system (MES) server 90, a database server 100 and its associated data store 110, a tool ranking unit 120, and one or more process controllers 130. As will be described in greater detail below, the tool ranking unit 120 evaluates the performance of past iterations of the processes to identify the optimal or near optimal tool for processing a particular lot at a particular point in the process flow.

In the illustrated embodiment, the manufacturing system 10 is adapted to fabricate semiconductor devices. Although the subject matter is described as it may be implemented in a semiconductor fabrication facility, it is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

The network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. The tools 30-80 are grouped into sets of like tools, as denoted by lettered suffixes. For example, each set of tools 30A-30C, 40A-40D, 50A-50C, 60A-60B, 70A-70C, and 80A-80C represents tools of a certain type, such as a chemical mechanical planarization tool. The tools 30-80 may process single wafers, individual lots, multiple lots, etc. Some of the tools 30-80 may be cluster tools including multiple chambers for processing wafers in parallel. For purposes for tracking performance, as described in greater detail below, each chamber may be treated as a separate entity.

A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

The manufacturing execution system (MES) server 90 directs the high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the various tools by dispatching wafers to the available tools at a particular step in the process flow. Although the wafers are processed by lot in the illustrated example, the lot size may vary, and may even include only a single wafer, depending on the particular implementation.

The database server 100 stores data related to the status of the various entities and articles of manufacture in the process flow. The database server 100 may store information in one or more data stores 110. The data may include pre-process and post-process metrology data, tool states, lot priorities, etc.

Process controllers 130 may be associated with one or more of the process tools 30-80. The process controllers 130 determine control actions for controlling selected ones of the tools 30-80 serving as process tools based on metrology data collected during the fabrication of wafers (i.e., by others of the tools 30-80 serving as metrology tools). The particular control models used by the process controllers 130 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the present subject matter.

The processing and data storage functions are distributed amongst the different computers in FIG. 1 to provide general independence and central information storage. Of course, different numbers of computers and different arrangements may be used without departing from the spirit and scope of the present subject matter.

Portions of the present subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In general, the tool ranking unit 120 uses historical performance data associated with the processing of the lots to determine tool rankings at a particular step in the process flow, so that a tool factor may be included in the dispatch decision for a particular lot. Each lot has associated processing context data that indicates its product type, processing history, current place in the process flow, etc. The processing context data is used to identify a set of previously processed lots having the same processing context as a given lot at a particular step in the process flow. Performance data associated with the identified lots is used to generate tool scores for each of the tool that may be used to process the lot at the next operation.

Figure 2:
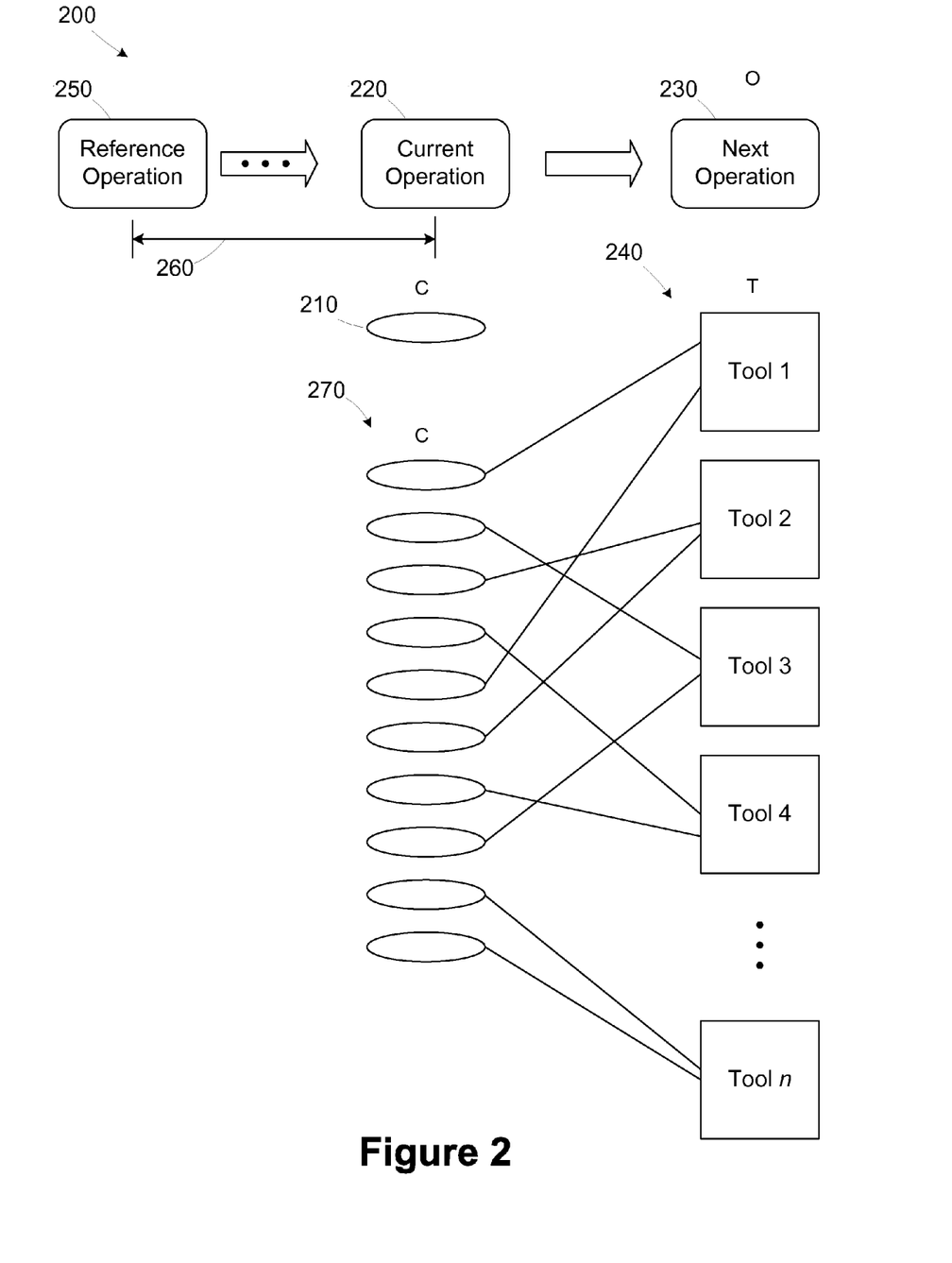
FIG. 2 is a diagram illustrating how tool scores may be used for dispatching a selected lot for its next operation.

FIG. 2 is a diagram of the process flow 200 illustrating a selected lot 210 that has completed a current operation 220 and is awaiting a next operation 230 in the process flow 200. A plurality of tools 240 (Tool 1 . . . n) are available for performing the next operation 230. The processing history of a lot is defined by the particular tools used to process a wafer between a reference operation 250 and the current operation 220. The intervening operations between the reference operation 250 and the current operation 220 define a processing history window 260, which represents the group of operations that the tool ranking unit 120 evaluates to match processing context across lots. The number of operations in the processing history window 260 may vary depending on the nature of the features being formed at the particular point in the process flow 200. For example, if the operations relate to a photolithography process with multiple layers, the operations in the window 260 may correspond to the formation and patterning different layers where the overlay characteristics between the layers are measured and controlled (e.g., by a process controller 130 in FIG. 1). In an example where a process is being performed to pattern transistor gate electrodes, the operations in the window 260 may relate to the critical dimensions (CD) of the electrodes. Each combination of tools used to perform the operations in the processing history window 260 (i.e. for a given product) defines a unique processing context, and may be assigned a unique processing context ID.

As lots are processed through the process flow 200, the tool ranking unit 120 tracks tool performance for the defined processing context IDs. The group 270 of lots represents lots with the same processing context ID as the selected lot 210 that have been previously processed in the process flow 200. After the current operation 220, each lot in the set 270 would have been processed by one of the tools 240 capable of performing the next operation 230. Metrology data collected for the lots in the group 270 indicates the performance of each associated tool 240 at the operation 230.

Based on the performance data collected for the next operation 230, the tool ranking unit 120 can rank the tools 240 to identify which tools are best suited for processing the selected lot 210. The tool ranking unit 120 uses the performance data to generate tool scores for each of the tools 240. The tool ranking unit 120 maintains a tool performance metric for each processing context/tool combination. For example, for a given processing context ID, the tool ranking unit 120 maintains n tool performance metrics.

A tool performance metric represents the performance of the tool at the operation 230, which may be generated based on the collected metrology data from lots processed by a particular tool. In a photolithography implementation, exemplary performance metrics may include process capability (Cpk), Intrafield, and Range. The values of the metrics may be evaluated in both X and Y directions. An equation for process capability may be expressed as:

$$Cpk(X/Y) = \frac{SPECLimit(X/Y)}{3 \cdot stdv(X/Y) + Intrafield(X/Y)}, \text{ where}$$

$$Cpk = \min[CpkX, CpkY].$$

Although Intrafield is used in the calculation of Cpk, it may also be used by itself as a performance metric. The maximum of the Intrafield(X/Y) represents the Intrafield metric and the maximum of Range(X/Y) represents the Range metric.

In some instances, deadbands may be defined for various performance metrics. For example, with Cpk, values between 0 and 1 are considered within the deadband, and are adjusted to 0. Cpk values greater than 2.0 are adjusted to be equal to 2.0. A second type of deadband may be defined based on the differences between the values. For example, a 1 nm range threshold may be defined for range and a 0.1 range threshold may be defined for Cpk. Values within the range threshold are adjusted to be the same.

In comparing performance metrics across tool, in some instances a maximum value represents the best case and a minimum value represents a worst case (i.e., referred to as a max criteria). Similarly, in other instances, a minimum value represents the best case and a maximum value represents the worst case (i.e., referred to as a min criteria). Cpk is an exemplary max criteria, and Intrafield and Range are exemplary min criteria.

The tool ranking unit 120 may update the performance metrics for each processing context/tool combination continuously as lots progress through the process flow 200. An averaging function, such as an exponentially weighted moving average (EWMA) may be used to track each performance metric over time. Hence, at a given time, the tool ranking unit 120 has updated performance metrics for each processing context/tool combination, indexed by the processing context ID.

At the time the selected lot 210 is available for dispatching to the next operation 230, the tool ranking unit 120 matches the processing context of the lot 210 to the set of tracked performance metrics. The master set of performance metrics may be defined as follows:

$$P_{O,C,T}$$

where O represents the set of operations in the process flow 200 for which tool scores are defined (i.e., may not be all operations), C represents the unique processing context IDs for each operation (i.e., processing context combinations defined by the product and processing histories in the processing history window 260 for the operation), and T represents the set of tools capable of performing a particular operation.

The processing context of the selected lot 210 is matched to a particular operation and processing context ID for the current operation 230. The processing context may be used to fix the particular operation, o, and the particular processing context ID, c, leaving a set of performance metrics indexed by tool $$P_{o,c,T}$$

where T ranges from 1 to n available tools for operation O.

Based on the identified set of performance metrics, the tool ranking unit 120 calculates a score for each tool 240. There are various techniques that may be used to generate a tool score. As described above, a given performance measure may represent a max criteria or a min criteria. Exemplary tool score equations for max and min criteria are $$\text{score} = \frac{v_{max} - v_i}{v_{max} - v_{min}} \quad \text{(min criteria)} \tag{1}$$

$$\text{score} = \frac{v_i - v_{min}}{v_{max} - v_{min}} \quad \text{(max criteria)} \tag{2}$$

where v is the value of the performance metric.

Equations (1) and (2) normalize the individual tool score based on the range of performance metrics across all of the tools. Hence, the tool with the worst performance metric receives a score of zero.

An example tool score example is provided in Table 1. The performance metric is Cpk, and the deadband is from 0 to 1. Hence, Equation (2) is used. $VT_n$ represents the tool value for tool n. In some cases dispatching algorithms employ symmetric factors to make dispatch decisions. Positive values represent that a tool is preferred, while negative values represent that a tool should be avoided. Hence, the normalized score resulting from Equations (1) or (2) can be transformed to a linear score from −100 to 100 by:

$$S_{linear} = 200 * S - 100 \tag{3}$$

TABLE 1

| Criteria | Operator | $VT_1$ | $VT_2$ | $VT_3$ | $v_{min}$ | $v_{max}$ |
|---|---|---|---|---|---|---|
| Performance Metric Values | | | | | | |
| Cpk | max | 0.9 | 1.2 | 1.5 | 0.9 | 1.5 |
| Adjusted Values (deadband check) | | | | | | |
| Cpk | max | 0.0 | 1.2 | 1.5 | 0.0 | 1.5 |
| Criteria | Operator | $S_1$ | $S_2$ | $S_3$ | | |
| Tool Scores | | | | | | |
| Cpk | max | 0.0 | 0.6 | 1.0 | | |
| Linear Tool Scores | | | | | | |
| Cpk | max | −100.0 | 20 | 100.0 | | |

In some instances, it may not be the case that the lowest scoring tool is actually unsuitable for processing the lot 210. Hence, a scaling factor may be used in calculating the score. For example, if a scaling factor of 2 is used, the "worst" possible score would be 2 times the lowest score for the tools.

$$\text{score} = \min\left[1.0, \frac{v_{min} \times f - v_i}{v_{min} \times f - v_{min}}\right] \quad \text{(min criteria)} \quad (4)$$

$$\text{score} = \max\left[0.0, \frac{v_i - v_{max}/f}{v_{max} - v_{max}/f}\right] \quad \text{(max criteria)} \quad (5)$$

An example, using Cpk and a scaling factor of 2.0 is shown below in Table 2. Equation (5) is employed.

TABLE 2

| Criteria | Operator | $VT_1$ | $VT_2$ | $VT_3$ | $v_{min}$ | $v_{max}$ |
|---|---|---|---|---|---|---|
| Performance Metric Values | | | | | | |
| Cpk | max | 1.1 | 1.2 | 1.5 | 1.1 | 1.5 |
| Adjusted Values (deadband check) | | | | | | |
| Cpk | max | 1.1 | 1.2 | 1.5 | 1.1 | 1.5 |

| Criteria | Operator | $S_1$ | $S_2$ | $S_3$ |
|---|---|---|---|---|
| Tool Scores | | | | |
| Cpk | max | 0.5 | 0.6 | 1.0 |
| Linear Tool Scores | | | | |
| Cpk | max | 0 | 20 | 100 |

In some embodiments, multiple performance metrics may be tracked for a given operation. The scores resulting from each performance metric may be weighted and combined to generate an overall score. The following example illustrated in Table 3 evaluates performance metrics of Range (min criteria—Eq. (1), Cpk (max criteria—Eq. (2), and Intrafield (min criteria—Eq. (1)).

TABLE 3

| Criteria | Operator | $VT_1$ | $VT_2$ | $VT_3$ | $v_{min}$ | $v_{max}$ |
|---|---|---|---|---|---|---|
| Performance Metric Values | | | | | | |
| Range | Min | 20 nm | 19 nm | 19 nm | 19 nm | 20 nm |
| Cpk | Max | 2.7 | 2.0 | 2.8 | 2.0 | 2.8 |
| Intrafield | min | 7 nm | 5 nm | 9 nm | 5 nm | 9 nm |
| Adjusted Values (deadband check) | | | | | | |
| Range | Min | 19 nm | 19 nm | 19 nm | 19 nm | 19 nm |
| Cpk | Max | 2.8 | 2.0 | 2.8 | 2.0 | 2.8 |
| Intrafield | Min | 7 nm | 5 nm | 9 nm | 5 nm | 9 nm |

| Criteria | | $S_1$ | $S_2$ | $S_3$ |
|---|---|---|---|---|
| Tool Scores | | | | |
| Operator | | | | |
| Range | Min | 1.0 | 1.0 | 1.0 |
| Cpk | Max | 1.0 | 0.0 | 1.0 |
| Intrafield | Min | 0.5 | 1.0 | 0.0 |

TABLE 3-continued

| | Weighted Tool Scores | | | |
|---|---|---|---|---|
| | Weight | | | |
| Range | 0.1 | 1.0 | 1.0 | 1.0 |
| Cpk | 0.4 | 1.0 | 0.0 | 1.0 |
| Intrafield | 0.5 | 0.5 | 1.0 | 0.0 |
| Result | | 0.75 | 0.60 | 0.50 |
| Linear Tool Scores | | | | |
| Result | | 50 | 20 | 0 |

In yet another example, Equations (4) and (5) implementing a scaling factor may be used.

TABLE 4

| Criteria | Operator | $VT_1$ | $VT_2$ | $VT_3$ | $v_{min}$ | $v_{max}$ |
|---|---|---|---|---|---|---|
| Performance Metric Values | | | | | | |
| Range | min | 20 nm | 19 nm | 19 nm | 19 nm | 20 nm |
| Cpk | max | 2.7 | 2.0 | 2.8 | 2.0 | 2.8 |
| Intrafield | min | 7 nm | 5 nm | 9 nm | 5 nm | 9 nm |
| Adjusted Values (deadband check) | | | | | | |
| Range | min | 19 nm | 19 nm | 19 nm | 19 nm | 19 nm |
| Cpk | max | 2.8 | 2.0 | 2.8 | 2.0 | 2.8 |
| Intrafield | min | 7 nm | 5 nm | 9 nm | 5 nm | 9 nm |

| Criteria | | $S_1$ | $S_2$ | $S_3$ |
|---|---|---|---|---|
| Tool Scores | | | | |
| Operator | | | | |
| Range | min | 1.0 | 1.0 | 1.0 |
| Cpk | Max | 1.0 | 0.4 | 1.0 |
| Intrafield | Min | 0.8 | 1.0 | 0.2 |
| Weighted Tool Scores | | | | |
| Weight | | | | |
| Range | 0.1 | 1.0 | 1.0 | 1.0 |
| Cpk | 0.4 | 1.0 | 0.4 | 1.0 |
| Intrafield | 0.5 | 0.8 | 1.0 | 0.2 |
| Result | | 0.80 | 0.76 | 0.60 |
| Linear Tool Scores | | | | |
| Result | | 60 | 52 | 20 |

The previous tool score examples are intended to provide sample tool scoring techniques that may be used. Of course, tool scores may be calculated in a variety of ways given the performance data tracked for the processing context/tool combinations. The present subject matter is not limited to a particular methodology for calculating the performance metrics or the tool scores.

The tool ranking unit 120 provides the tool scores for the selected lot 210 to the MES server 90 for making dispatch decisions. In general, the MES server 90 operates as a dispatching unit and employs business rule logics and (module) specific requirements to make dispatch decisions. For example, an overall score of −100 . . . −95 indicates no processing, while an overall score of 95 . . . 100 indicates must processing. The tool score components may be combined with other factors, such as priority, due date, cycle time, customer requirements, etc. to affect the flow of lots through the process flow 200.

Figure 3:
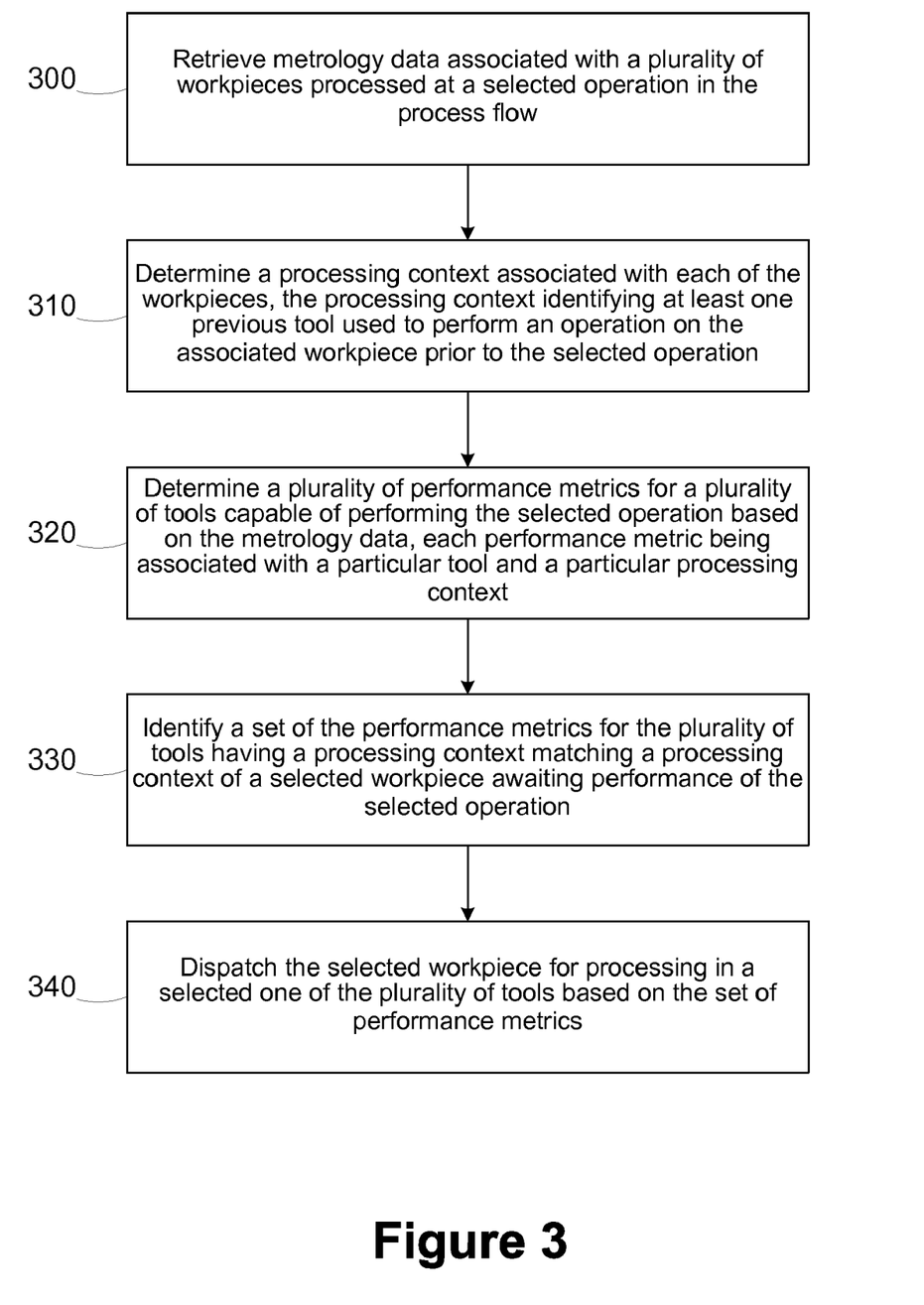
FIG. 3 is a simplified flow diagram of a method for dispatching workpieces in a process flow including a plurality of operations.

Referring now to FIG. 3, a simplified flow diagram of a method for dispatching workpieces in a process flow including a plurality of operations is provided. In method block, 300, metrology data associated with a plurality of workpieces processed at a selected operation in the process flow is retrieved. In method block, 310, a processing context associated with each of the workpieces is determined. The processing context identifies at least one previous tool used to perform an operation on the associated workpiece prior to the selected operation. In method block 320, a plurality of performance metrics for a plurality of tools capable of performing the selected operation is determined based on the metrology data. Each performance metric is associated with a particular tool and a particular processing context. In method block 330, a set of the performance metrics for the plurality of tools is identified having a processing context matching a processing context of a selected workpiece awaiting performance of the selected operation. In method block 340, the selected workpiece is dispatched for processing in a selected one of the plurality of tools based on the set of performance metrics.

Providing the tool scores allows the MES server 90 to direct lots to the "best" tool for processing a particular lot. Absent the other contributing factors, the selected lot 210 would be dispatched to the tool 240 having the highest tool score. If the queue for the highest scoring tool is full, the lot 210 could be dispatched to the next ranked tool. The combination of factors employed by the MES server 90 for dispatching combines tool preferences with overall FAB performance requirements. The tool rankings allow the tool preferences to be balanced against the other factors. Generally, the more often the "best" tool is employed, the better the results (i.e., reduced variation, improved performance, etc.). It would not normally be feasible to always use the "best" tool due to throughput factors, and the other components factored into the dispatching decisions. However, by using "better" tools, a significant improvement can still be realized. By combining the tool rankings with the other dispatch factors, the improvements can be achieved with little impact on the overall FAB performance.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for dispatching workpieces in a process flow including a plurality of operations, comprising:
   retrieving metrology data associated with a plurality of workpieces processed at a selected operation in the process flow;
   determining a processing context associated with each of the workpieces, the processing context identifying a plurality of previous operations performed on the associated workpiece prior to the selected operation and a previous tool associated with each of the previous operations;
   determining a plurality of performance metrics for a plurality of tools capable of performing the selected operation based on the metrology data, each performance metric being associated with a particular tool and a particular processing context;
   identifying a set of the performance metrics for the plurality of tools having a processing context matching a processing context of a selected workpiece awaiting performance of the selected operation; and
   dispatching the selected workpiece for processing in a selected one of the plurality of tools based on the set of performance metrics.

2. The method of claim 1, further comprising:
   determining a tool score for each of the plurality of tool based on the set of performance metrics; and
   ranking the tools based on the tool scores; and
   selecting one of the plurality of tools based on the ranked tools.

3. The method of claim 2, further comprising applying a deadband to the performance metrics in the set.

4. The method of claim 2, wherein at least a first subset of the performance metrics is associated with a first characteristic of the workpieces, a second subset of the performance metrics is associated with a second characteristic of the workpieces, and the method further comprises, for each tool;
   determining a first score associated with the first subset;
   determining a second score associated with the second subset; and
   combining the first and second scores to generate the tool score.

5. The method of claim 4, wherein combining the first and second scores further comprises weighting the first and second scores in generating the tool score.

6. The method of claim 2, wherein determining the tool score further comprises, for each tool:
   determining a difference between a maximum performance metric in the set and the performance metric associated with the tool; and
   normalizing the difference based on a range of the performance metrics in the set.

7. The method of claim 2, wherein determining the tool score further comprises, for each tool:
   determining a difference between the performance metric associated with the tool and a minimum performance metric in the set; and
   normalizing the difference based on a range of the performance metrics in the set.

8. The method of claim 2, wherein determining the tool score further comprises, for each tool:
   determining a difference between a minimum performance metric in the set multiplied by a scaling factor and the performance metric associated with the tool; and
   normalizing the difference based on a difference between the minimum performance metric multiplied by the scaling factor and the minimum performance metric.

9. The method of claim 2, wherein determining the tool score further comprises, for each tool:
   determining a difference between the performance metric associated with the tool and a maximum performance metric in the set divided by a scaling factor; and
   normalizing the difference based on a difference between the maximum performance metric and the maximum performance metric divided by the scaling factor.

10. The method of claim 1, the workpieces comprise semiconductor wafers.

11. The method of claim 10, wherein the selected operation comprises a photolithography operation, and the performance metric comprises at least one of a process capability measure, an intrafield overlay measure, and a range overlay measure.

12. The method of claim 1, wherein each performance metric comprises a moving average.

13. The method of claim 1, further comprising:
processing the selected workpiece in the selected tool;
collecting metrology data from the selected workpiece after the processing; and
updating the performance metric associated with the processing context of the selected workpiece and the selected tool.

14. The method of claim 1, wherein the processing context further includes a product type.

15. A system, comprising:
a plurality of tools capable of performing a selected operation in a process flow; and
a tool ranking unit operable to retrieve metrology data associated with a plurality of workpieces previously processed at the selected operation, determine a processing context associated with each of the workpieces, the processing context identifying a plurality of previous operations performed on the associated workpiece prior to the selected operation and a previous tool associated with each of the previous operations, determine a plurality of performance metrics for a plurality of tools capable of performing the selected operation based on the metrology data, each performance metric being associated with a particular tool and a particular processing context, identify a set of the performance metrics for the plurality of tools having a processing context matching a processing context of a selected workpiece awaiting performance of the selected operation, and generate a tool score for each of the tools based on the performance metrics; and
a dispatching unit operable to dispatch the selected workpiece for processing in a selected one of the plurality of tools based on the tool scores.

16. The system of claim 15, wherein the tool ranking unit is operable to rank the tools based on the tool scores, and select one of the plurality of tools based on the ranked tools.

17. The system of claim 15, wherein at least a first subset of the performance metrics is associated with a first characteristic of the workpieces, a second subset of the performance metrics is associated with a second characteristic of the workpieces, and the tool ranking unit is operable to, for each tool;
determine a first score associated with the first subset;
determine a second score associated with the second subset; and
combine the first and second scores to generate the tool score.

18. A system for dispatching workpieces in a process flow including a plurality of operations, comprising:
means for retrieving metrology data associated with a plurality of workpieces processed at a selected operation in the process flow;
means for determining a processing context associated with each of the workpieces, the processing context identifying a plurality of previous operations performed on the associated workpiece prior to the selected operation and a previous tool associated with each of the previous operations;
means for determining a plurality of performance metrics for a plurality of tools capable of performing the selected operation based on the metrology data, each performance metric being associated with a particular tool and a particular processing context;
means for identifying a set of the performance metrics for the plurality of tools having a processing context matching a processing context of a selected workpiece awaiting performance of the selected operation; and
means for dispatching the selected workpiece for processing in a selected one of the plurality of tools based on the set of performance metrics.

* * * * *